US011082090B2

(12) United States Patent
Domanovitz et al.

(10) Patent No.: US 11,082,090 B2
(45) Date of Patent: Aug. 3, 2021

(54) TIME-DIVISION DUPLEXING SIGNAL BOOSTER

(71) Applicant: ACTELIS NETWORKS (ISRAEL) LTD., Petach Tikva (IL)

(72) Inventors: Elad Domanovitz, Mazkeret Batya (IL); Oded Sinai, Kfar Haoranim (IL); Mauricio Nurko, Petach Tikva (IL); Sarit Uval, Givataim (IL)

(73) Assignee: ACTELIS NETWORKS (ISRAEL) LTD., Petach Tikva (IL)

( * ) Notice: Subject to any disclaimer, the term of this patent is extended or adjusted under 35 U.S.C. 154(b) by 0 days.

(21) Appl. No.: 16/301,139

(22) PCT Filed: May 18, 2017

(86) PCT No.: PCT/IL2017/050560
§ 371 (c)(1),
(2) Date: Nov. 13, 2018

(87) PCT Pub. No.: WO2017/199259
PCT Pub. Date: Nov. 23, 2017

(65) Prior Publication Data
US 2019/0296792 A1   Sep. 26, 2019

Related U.S. Application Data

(60) Provisional application No. 62/337,910, filed on May 18, 2016.

(51) Int. Cl.
*H04B 3/36* (2006.01)
*H04L 5/14* (2006.01)
(Continued)

(52) U.S. Cl.
CPC ............... *H04B 3/36* (2013.01); *H04B 7/00* (2013.01); *H04B 7/15535* (2013.01);
(Continued)

(58) Field of Classification Search
CPC ........ H04B 3/36; H04B 7/15535; H04B 7/00; H04B 7/2606; H04L 5/1423; H04L 5/1461; H04L 5/1469; H04M 11/062
See application file for complete search history.

(56) References Cited

U.S. PATENT DOCUMENTS 9,974,074 B2 * 5/2018 Ben-Shlomo ............ H04B 1/48
2006/0098592 A1 * 5/2006 Proctor, Jr. ......... H04W 84/047
370/315
(Continued)

FOREIGN PATENT DOCUMENTS

EP 2879293 6/2015
KR 2009 0132735 12/2009

OTHER PUBLICATIONS

International Search Report dated Sep. 27, 2017 for corresponding PCT Application No. PCT/IL2017/050560.
(Continued)

*Primary Examiner* — Vineeta S Panwalkar
(74) *Attorney, Agent, or Firm* — Pearl Cohen Zedek Latzer Baratz LLP

(57) ABSTRACT

A TDD signal booster includes first and second bidirectional terminals and an amplifier circuit arranged in a signal path between said first and second terminals. The amplifier circuit is to amplify TDD signals received at one of said first and second terminals for transmission from the other of said first and second terminals. The amplifier circuit is operable in a first configuration for amplifying TDD signals in one direction along the signal path and a second configuration for amplifying TDD signals in the opposite direction along the signal path. A control circuit is arranged to detect a silent period in said TDD signals, e.g. the guard period, and, in response to detecting the silent period, control said amplifier circuit to change configuration.

14 Claims, 4 Drawing Sheets

GBA with two amplification paths which are enabled based on transmission direction

(51) Int. Cl.
*H04B 7/155* (2006.01)
*H04B 7/00* (2006.01)
*H04B 7/26* (2006.01)

(52) U.S. Cl.
CPC ......... *H04B 7/2606* (2013.01); *H04L 5/1423* (2013.01); *H04L 5/1461* (2013.01)

(56) References Cited

U.S. PATENT DOCUMENTS

| | | |
|---|---|---|
| 2007/0015462 A1 | 1/2007 | Dean et al. |
| 2010/0273415 A1 | 10/2010 | Almgren et al. |
| 2011/0135308 A1 | 6/2011 | Tarlazzi et al. |
| 2013/0114480 A1 | 5/2013 | Chapman et al. |
| 2015/0249513 A1* | 9/2015 | Schwab ................ H04L 5/1469 370/278 |
| 2016/0099748 A1 | 4/2016 | Schmid et al. |

OTHER PUBLICATIONS

Search Report dated Dec. 12, 2019 for corresponding EP Application No. EP17798893.8.

\* cited by examiner

Figure 1 - TDD frame

Figure 2 - GBA with two amplification paths which are enabled based on transmission direction Figure 3 - GBA with single amplification path and switches which direct signals based on transmission direction

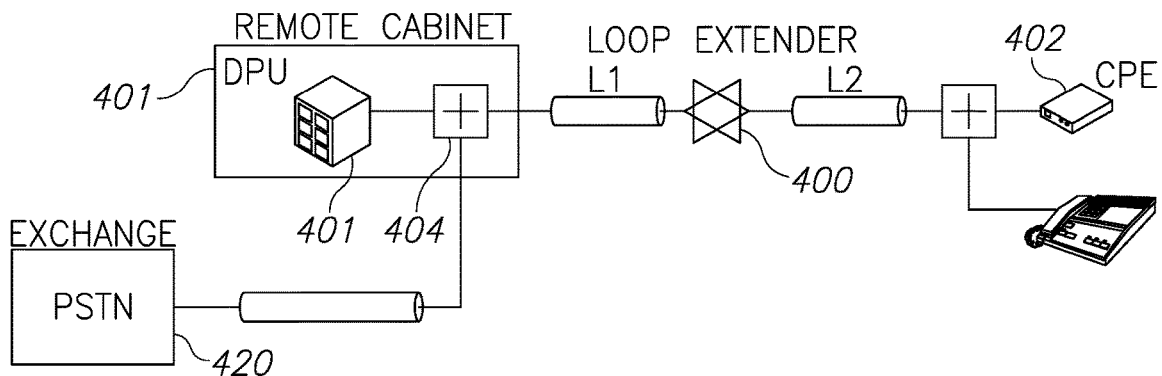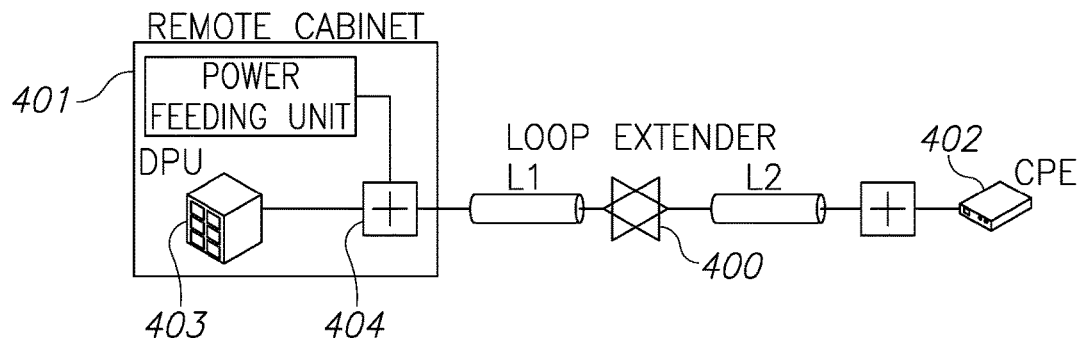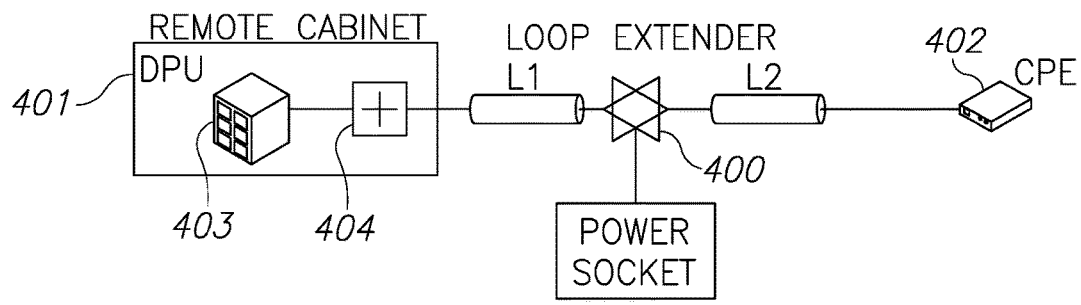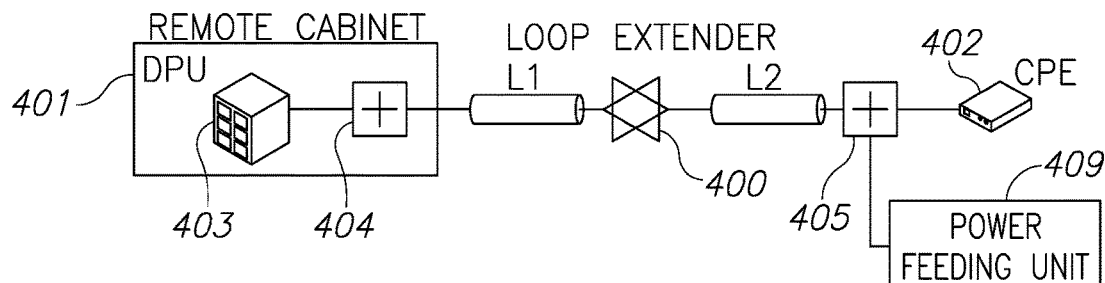
Figure 4

TIME-DIVISION DUPLEXING SIGNAL BOOSTER

CROSS-REFERENCE TO RELATED APPLICATIONS

This application is a National Phase Application of PCT International Application No. PCT/IL2017/050560, International Filing Date May 18, 2017, claiming priority of U.S. Provisional Patent Application No. 62/337,910, filed May 18, 2016, which is hereby incorporated by reference.

FIELD OF THE INVENTION

The present invention relates to boosters for signals such as data signals, designed to amplify signals and thereby enable them to be propagated over longer distances. Such devices are also commonly referred to as "repeaters", "extenders" and "amplifiers".

BACKGROUND OF THE INVENTION

The demand for higher data rates is continuously increasing, which makes improvements of network architecture necessary. Strong competition from cable network operators increases the pressure on traditional network operators to deliver high speed services. Digital Subscriber Lines "DSL", sometimes called digital subscriber "loops", offer speeds up to several megabits per second (Mbps), depending upon distance for example from a telephone service provider's central office "CO" to customer premises equipment "CPE". A pure fiber network results in very high costs to be built today on a large scale. During the transition from copper-based access networks to pure fiber networks, the fiber network is being gradually extended to get closer to the subscribers.

Fiber to the distribution point "FTTdp" provides a new solution to these problems between the existing fiber to the home "FTTH", fiber to the building "FTTB" and fiber to the curb "FTTC" topologies. In many cases it is not favorable to connect the fiber directly to the customer premises. The copper wires between the distribution point "DP" and the customer may be low quality telephony cable bundles with wire pairs for multiple subscribers.

G.Fast aims to provide ultra-high speeds over copper twisted pairs, up to and sometimes even exceeding speeds of 1 Gbps. Originally, the planned loop lengths for G.Fast were from 50 to 250 meters (150 to 750 feet). Current implementations, reach up to 500 meters. G.Fast is being standardized as ITU-T Recommendation G.9701 Similar to currently deployed technologies, G.Fast supports vectoring, which reduces far-end crosstalk that is generated in multi-pair deployments and is a significant impairment at higher frequencies. The first version of G.Fast operates over frequencies of up to 106 MHz, and uses linear vector pre-coding to eliminate crosstalk in both downstream and upstream directions. A future version of G.Fast may operate over frequencies of up to 212 MHz, and may support higher-performance non-linear pre-coding to allow for even higher speeds.

Unlike prior DSL technologies (for example Asymmetric DSL "ADSL", and Very-high-bit-rate digital subscriber line "VDSL") which used Frequency Division Duplexing "FDD", G.Fast uses Time-Division Duplexing "TDD". With TDD, the system transmits only downstream signals for a fraction of time, and transmits only upstream signals for the remaining time. On one hand, TDD allows the speed asymmetry to be varied at will among all the lines emanating from the same DP. This allows some areas to be served with business-class symmetric service, while other areas can be served with asymmetric service that best addresses consumer needs. On the other hand, TDD means that all modems located at the same DP must have the same upstream "US"/downstream "DS" configuration (failing to meet this requirement results with strong coupling and hence severe degradation in performance).

A DP may require power. This can be solved with reverse power feeding "RPF". RPF may solve the problem of supplying a Digital Subscriber Line Access Multiplexer "DSLAM" located in the DP with power. However, this may create new challenges if the energy budget for a reverse powered DP box is very limited.

Prior to setting forth a short discussion of the related art, it may be helpful to set forth definitions of certain terms that will be used hereinafter.

BRIEF SUMMARY OF EMBODIMENTS OF THE INVENTION

Some embodiments of the present invention provide a signal booster and systems including a system booster. A booster according to some embodiments of the invention may be adapted for TDD signals and may comprise first and second bi-directional terminals and an amplifier circuit. The amplifier circuit is arranged in a signal path between said first and second terminals to amplify signals received at one of said first and second terminals for transmission from the other of said first and second terminals. The amplifier circuit is operable in a first configuration for amplifying signals in one direction along the signal path and a second configuration for amplifying signals in the opposite direction along the signal path. A control circuit is arranged to detect a silent period or interruption in the signals, for example in signals at one of the first and second terminals, such as the guard period which is used in TDD signals according to some standards. In response to detection of interruption, according to some embodiments of the invention, the control circuit is arranged to control the amplifier circuit to change configuration. According to some embodiments of the invention, the amplifier is arranged to operate in only one of said first and second configurations at any time. Systems according to some embodiments of the invention may include a signal booster and one or more components remote from the amplifier circuit. Such components may be in any one or more of service provider equipment, distribution point equipment and customer premises equipment.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIG. 4 illustrates four systems according to embodiments of the invention in which a booster is powered in different ways.

Figure 1:
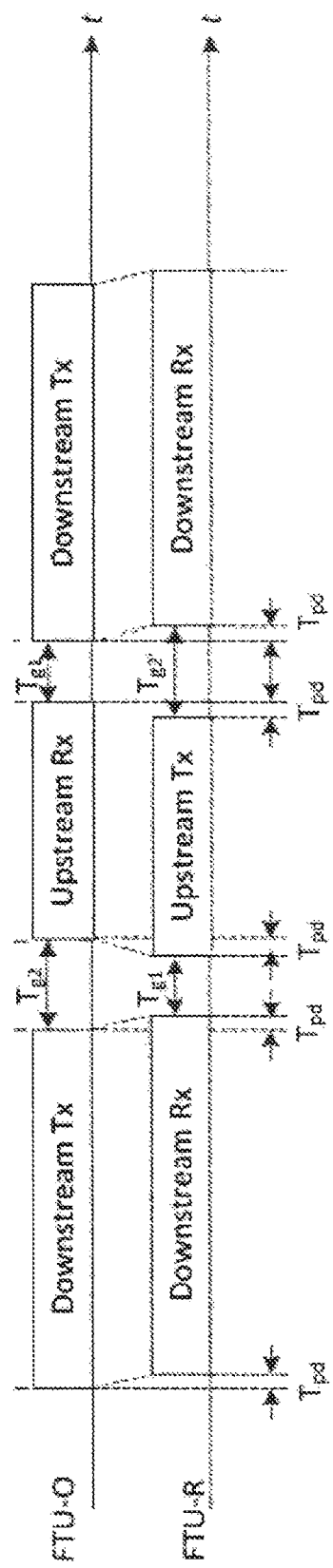
FIG. 1 depicts transmission of signals in a TDD system according to some embodiments of the invention.

The drawings together with the following detailed description make the embodiments of the invention apparent to those skilled in the art.

DETAILED DESCRIPTION OF EMBODIMENTS OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Some embodiments of the present invention may be used to provide means for the extension of the G.Fast service, for example to enable signals to be propagated over greater distances. Some embodiments of the invention may enable this to be achieved with no change of service provider equipment and/or software such as may be provided for example at a service provider CO. Additionally or alternatively some embodiments of the invention may enable extension of the G.Fast service to be achieved with no change of customer equipment and/or software such as may be provided for example as CPE. It is an objective of some embodiments of the present invention to enable DSL service providers to economically extend their market coverage, compete with broadband cable providers in terms of speed, and to enable them to roll out coverage and service improvements more rapidly than broadband cable suppliers due to lower capital needs for infrastructure extension.

Some embodiments of the invention may provide a loop or line extender, for example designed to be located between a distribution point unit "DPU" (which is equivalent to the DSLAM in ADSL/VDSL) and CPE. The loop extender may be an analog amplifier which will amplify both US and DS signals. Embodiments of the invention may be used in many applications including but not limited to situations where TDD signals are being propagated along copper or other wires such as unshielded twisted pair "UTP" wires, and situations in which signals are propagated wirelessly.

In some possible applications for a loop extender or signal booster for TDD signals, circuit stability may present a problem, particularly since DSL transmission in both directions US and DS is done on the same two wires, and ideally both should be amplified. For example a wide spectrum amplifier targeted for amplifying signals propagated in one direction would amplify also signals (or noise) being propagated in the other direction. Reckless design might lead to unstable devices that would oscillate.

For example, it might be desired to amplify signals from an ADSL modem (both DS and US) and two wide spectrum amplifiers working simultaneously (each at different direction) might be used to do this. In this case, the DS signal may be amplified by the DS amplifier. This signal may appear as an input for the US amplifier and be amplified again and so forth. This process might lead to major instability (or significant performance loss if not treated properly).

Current loop-extension products utilize the FDD structure of commonly used DSL products (ADSL and VDSL) and have filters to attenuate out-of-band signals. Another option is to use an analog echo-canceller at the 4wire to 2wire conversion point commonly present in such products to reduce the levels of out-of-band signals reflected at the input of the other direction amplifier.

G.Fast modems are TDD modems. For this method of transmission, filters are not suitable for the prevention of infinite amplification since transmission is performed over the entire allocated spectrum. Echo cancellation can be used, though its practical abilities impose a hard limit on the maximal level of amplification that can be used (and thus significantly reduce the potential of the device).

In any TDD system operating according to current standards, there is a "guard interval" between the end of the DS transmission and the beginning of the US transmission and vice versa. During the guard interval no data signals are transmitted. This is depicted in FIG. 1 according to the G.9701 standard. In this figure, FTU-O stands for the CO side and FTU-R stands for the CPE side. The guard intervals in the transmission for the CO in this case are marked as Tg2 and Tg1.

Utilizing the fact that there is a guard interval between the end of transmission at the DS direction the beginning of transmission at the US (and vice versa), according to some embodiments of the invention a system is proposed which may avoid the problem of instability. This may be achieved according to embodiments of the invention by enabling amplification only at the direction of transmission (and disabling amplifiers at the other direction). According to some embodiments of the invention, a detector is used to detect when transmission is stopped, or at least when transmission of data is stopped, or there is a silence period or interruption in transmission. In response to detection of a silence period or interruption, amplification may be disabled in one direction an enabled in the opposite direction. For example, if transmission stops at the DS direction, amplification in this direction may be disabled and amplification in the US direction may be enabled and vice versa.

According to some embodiments of the invention, an amplifier circuit is used which comprises a first amplifier for amplifying signals in one direction along the signal path and a second amplifier for amplifying signals in the opposite direction. An example of one such embodiment is shown in FIG. 2.

Figure 2:
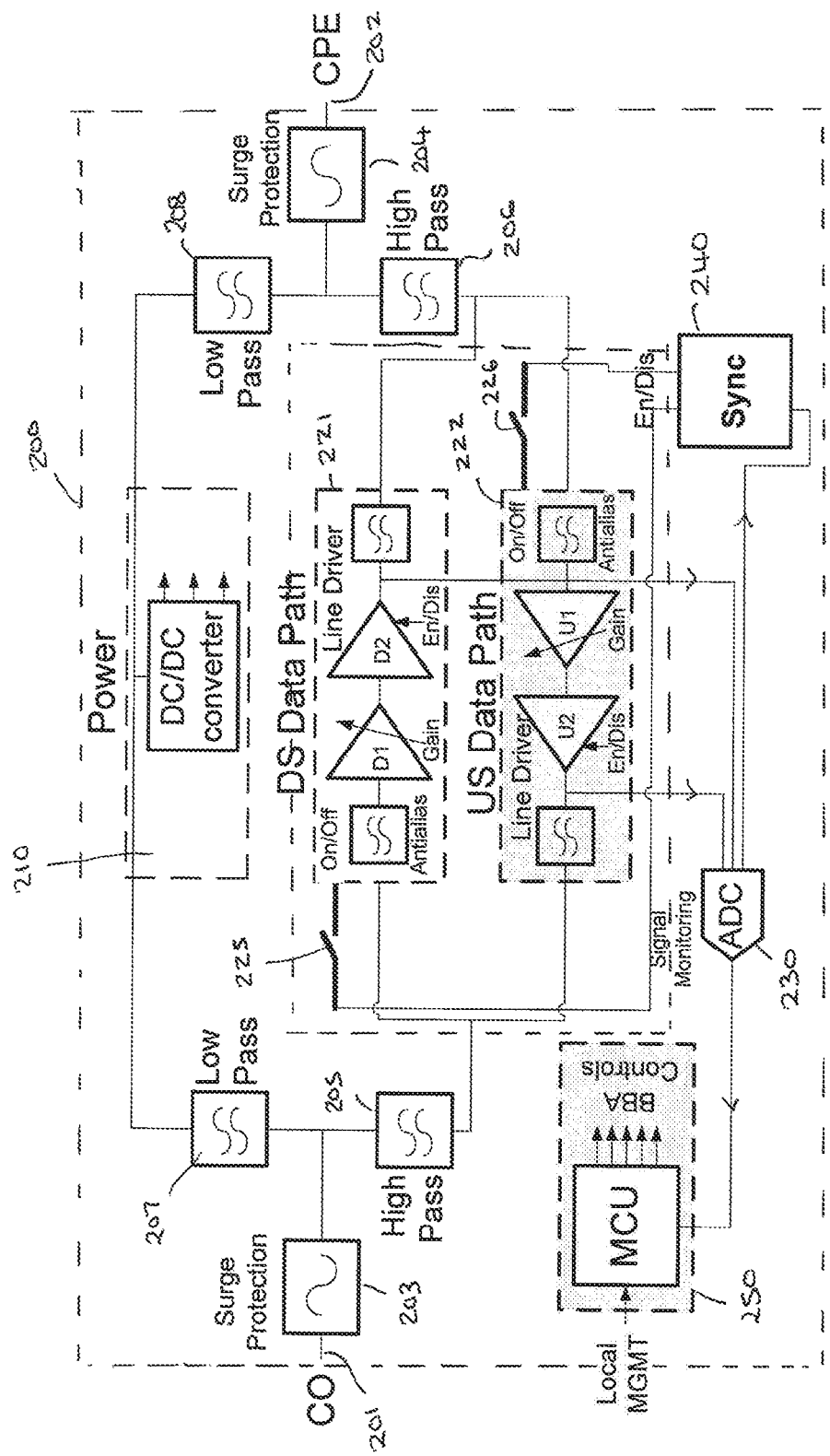
FIG. 2 shows a booster also referred to as a loop extender, according to some embodiments of the invention.

FIG. 2 shows a signal booster 200, also referred to as a loop extender, specifically a G.Fast broadband amplifier "GBA", according to some embodiments of the invention. In this embodiment the booster is designed to be positioned between CO and CPE. A similarly designed booster could be positioned in any wired part of a communication network, for example but not limited to between DP and CPE. The wiring may be part of a plain old telephone system "POTS".

The booster 200 comprises a first bidirectional terminal 201 on the CO side and a second bidirectional terminal 202 on the CPE side. A booster according to embodiments of the invention may be installed in systems using different kinds of transmission media including but not limited to wired, e.g. copper, and wireless. In the following specific reference is made to wired communications simply by way of example. Thus each terminals 201 and 202 of FIG. 2 may be connected to twisted pair wires. Conventionally the direction from CO to CPE is referred to as downlink or DS and the direction from CPE to CO is referred to as uplink or US, although signals pass in both directions.

Surge protectors 203 and 204 are provided at the respective terminals 201 and 202. The booster illustrated in FIG. 2 is designed to use POTS power. Incoming signals are filtered by low pass filters 207, 208 to pass voice signals, and in the downstream direction to extract direct current "DC". High pass filters 205, 206 extract data signals. Extracted DC is transformed in DC/DC convertor 210 to provide power to components in the booster 200.

An amplifier circuit 220 is arranged in the signal path between the high pass filters 205, 206. Circuit 220 includes a first amplifier or line driver 221 for amplifying signals in one direction, DS, and a second amplifier or line driver 222 for amplifying signals in the opposite direction, US. Each amplifier 221, 222 includes the usual components known to those skilled in the art such as but not limited to anti-aliasing filters, variable gain amplifier D1, U1 and main amplifier D2, U2. A first switch 225 is arranged to connect or disconnect the first amplifier 221 from the signal path, also referred to as data path, between the terminals 201, 202. A second switch 226 is arranged to connect or disconnect the second amplifier 222 from the signal or data path between the terminals 201, 202.

Each amplifier 221, 222 supplies signals, e.g. data signals, to an analog to digital convertor "ADC" 230. ADC convertor 230 is used to detect signals output from the respective amplifiers 221, 222. The output from the ADC 230 is connected to a control or SYNC circuit 240. After conversion digital signals are provided to a local management unit 250 including microcontroller unit "MCU" for operation of management functions not related to the present invention. The control circuit 240 may use the digital output from ADC 230 to perform synchronization and detection of US/DS signals to identify a silence period or interruption in data signals such as might indicate the commencement of a guard period. In other embodiments, the control or SYNC circuit 240 is connected directly to the output of the amplifiers (in order to process analog signals rather than digital signals). In response to detection of a signal interruption, control circuit 240 may control amplifier circuit 220 to change configuration, for example by controlling on/off switches 225, 226. In a first configuration, switch 225 is closed and switch 226 is open whereby amplifier 221 is connected in series in a signal path between the respective high pass filters 205, 206 to amplify DS signals, and amplifier 222 is disconnected from the signal path. In a second configuration switch 225 is open and switch 226 is closed whereby amplifier 222 is connected in series in a signal path between the respective high pass filters 205, 206 to amplify US signals and amplifier 221 is disconnected.

In this embodiment of the invention the change in configuration is achieved through hardware using switches. Other possibilities for effecting the change include but are not limited to enabling or disabling one or more components in the respective amplifiers according to the desired direction of amplification. Thus, for example the control circuit 240 may send enable/disable signals to the main amplifier components D1 and U1 in the respective amplifiers 221 and 222.

It will be noted from FIG. 1 that the duration of the guard period is different depending on whether the signals are transitioning from US to DS or vice versa. This difference may be detected and used by the control circuit 240 to determine, for example on initial start-up, which of the two possible circuit configurations should be implemented on detection of a signal interruption. Other mechanisms will be familiar to those skilled in the art to determine the direction of change in configuration of the amplifier circuit.

For example, according to some embodiments of this invention including all of those illustrated in the figures here, a Phase Locked Loop "PLL" may be added to signal the system if current transmission is DS transmission or US transmission (and the detector decisions can be used to track the PLL timing). The PLL may for example be connected to the SYNC or control circuit 240 and the circuit 240 can adjust the PLL for drifts in US/DS timing.

According to some embodiments of the invention, the two amplifiers 221, 222 of FIG. 2 may be replaced with a single amplifier using suitable switching. An example of how this may be achieved is shown in FIG. 3.

Figure 3:
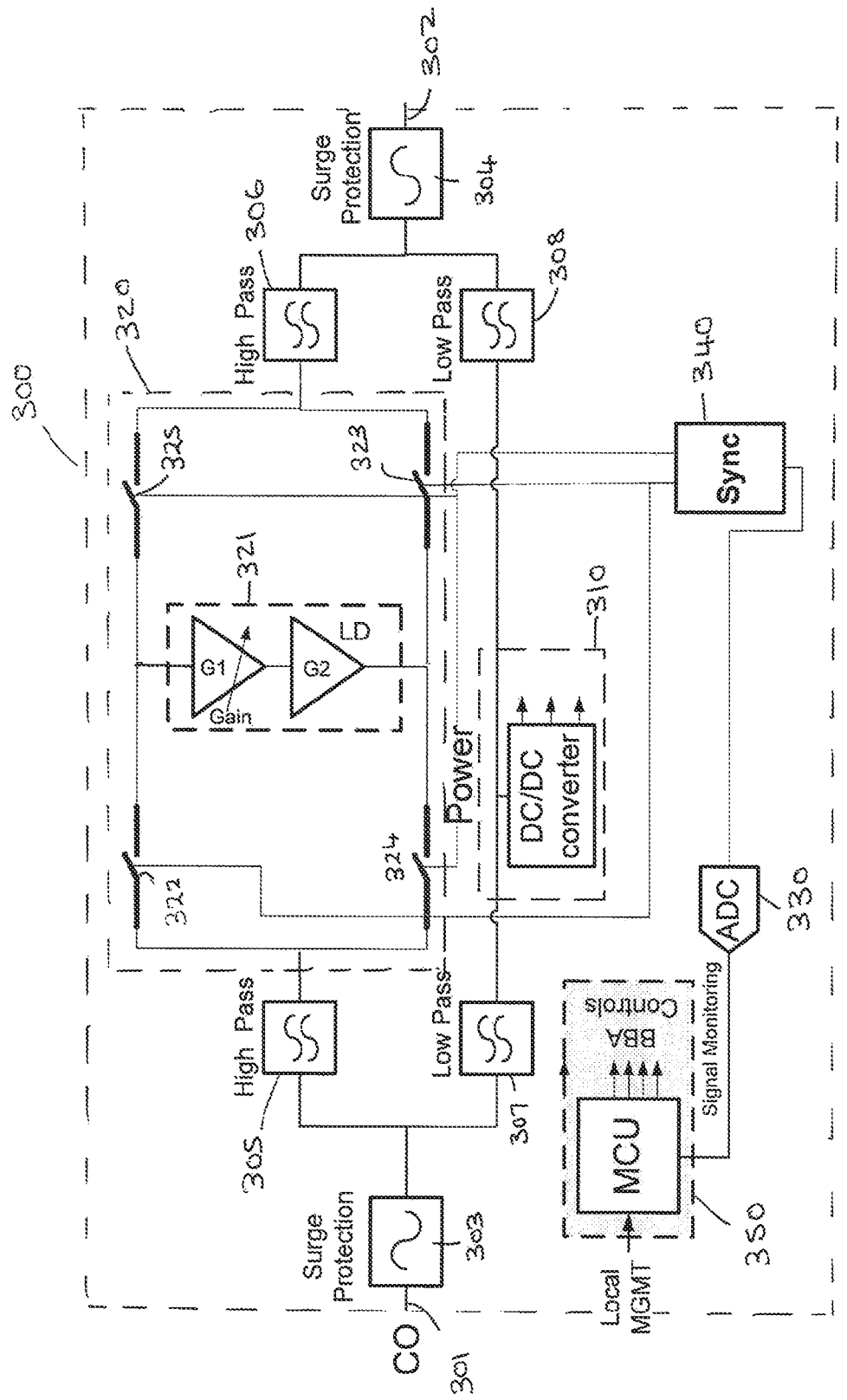
FIG. 3 shows an alternative booster according to embodiments of the present invention.

FIG. 3 shows an alternative signal booster 300, or loop extender, according to some embodiments of the invention. Several components in FIG. 3 may operate in a similar manner to the corresponding components in FIG. 2 and are not described further. For example terminals 301, 302, may perform the same function as terminals 201, 202; surge protectors 303, 304 may perform the same function as surge protectors 203, 204 and so on for high and low pass filters 305-308, transformer 310, ADC convertor 330 and local management unit 350.

In the embodiment shown in FIG. 3, a single amplifier 320 serves to amplify signals in both directions US and DS. Switches 322, 323, 324, 325 are controlled by control circuit 340 and arranged such that when switches 322, 323 are closed and switches 324, 325 are open amplifier 321 is connected for DS amplification and when switches 322, 323 are open and switches 324, 325 are closed amplifier 321 is connected for US amplification. The effect of operation of the switches under the control of control circuit is to change the configuration of the amplifier circuit 320. In one configuration the amplifier 321 input is connected to the first terminal 301 and the amplifier 321 output is connected to the second terminal 302. In the other configuration these connections are reversed. Each of the amplifier 321 input and output is connected to the other of the booster terminals 301, 302. Thus when the direction of transmission changes the direction of transmission through the amplifier 321 is not changed.

FIGS. 2 and 3 each show a single signal path and one pair of bidirectional terminals. Some practical embodiments of booster according to the invention may include terminals for multiple wires or pairs of wires and amplification paths for each signal path. Thus for example a booster or system according to some embodiments of the invention may comprise respective amplifiers for multiple signal paths, possibly in the form of an array of amplifiers, each working on a different pair of wires.

According to some embodiments of the invention the booster may be built from active components which may require power feeding. Boosters according to some embodiments of the invention may be fed, in similar manner to ADSL and VDSL amplifiers, from POTS power if it exists. Examples of possible use of POTS power are shown in FIGS. 2 and 3.

FIG. 4 illustrates four systems according to some embodiments of the invention in which a booster or loop extender, is powered in different ways.

Each of the systems shown in FIG. 4 includes a loop extender 400 which may be a booster according to embodiments of the invention described with reference to FIGS. 2 and 3. In each case the loop extender 400 is connected by respective lengths of wire L1 and L2 between service provider apparatus, shown in these examples as remote cabinet 401 (in other embodiments it can be CO) and customer apparatus, in these examples the CPE 402.

The service provider apparatus in some systems according to embodiments of the invention may include, as shown in FIG. 4, a DPU 403 and a modem 404 modulating or demodulating signals. DPU 403 and modem 404 may be located at a DP.

CPE or other customer apparatus in some systems according to embodiments of the invention may include a modem and other equipment such as a wireless router, firewall or gateway.

Power option 1 shown in FIG. 4 shows a system according to some embodiments of the invention in which a loop extender is supplied with POTS power. Here telephone signals received via the packet switched telephone network "PSTN" (marked as 420) are combined with data provided by the DPU 403 and modulated by modem 404 for onward transmission to the CPE. In the reverse direction modem 402 serves to demodulate received signals to separate telephone signals from data. The loop extender 400 extracts power from the POTS for example as described with reference to FIGS. 2 and 3.

Instead of using POTS power, since it may not always be available, systems according to some embodiments of the invention provide power to the loop extender from the service provider side, for example at the DP or CO. One example of such a system is illustrated as Power option 2 in FIG. 4 where an additional power feeding unit 406 is provided on the service provider side and power is combined with data from the DPU 403 in the modem 404 for onward transmission to the CPE. The loop extender 400 in this option may for example be any booster described with reference to FIGS. 2 and 3 which is designed to extract and use power provided with the signals for onward transmission. Thus a system according to some embodiments of the invention comprises a booster and service provider equipment including a power feeding unit. The service provider equipment may be arranged to supply power from the power feeding unit via wires along with transmitted signals.

In systems according to some embodiments of the invention, power for use by the booster or loop extender can be fed locally. Power option 3 in FIG. 4 shows a booster 400 according to some embodiments of the invention provided with power from a mains power socket. The booster may need to be adapted to obtain local power, for example it may be provided with a power supply or transformer to enable it to use mains or other local power, for example from a local generator.

It is also possible for a booster according to embodiments of the invention to be fed with power from the CPE using RPF. RPF can be used to feed a DPU (DLSAM) on the CO or DP side. In some embodiments of this invention a booster is adapted to use power sent from the CPE. One such embodiment is illustrated as Power option 4 in FIG. 4. The configuration of the booster 400 in FIG. 4 option 4 would be similar to those shown in FIGS. 2 and 3 with the DC/DC input direction reversed. The CPE in this option includes a power feeding unit 409. If the CPE power was intended for a DSLAM or DPU it might be necessary to ensure that the DSLAM or DPU is not starved of power by extracting only a small part of the power sent from the CPE to the DSLAM or DPU. Thus a system according to some embodiments of the invention comprises a booster and customer equipment including a power feeding unit. The service provider equipment may be arranged to supply power from the power feeding unit via wires along with transmitted signals.

In another embodiment, not illustrated, dedicated copper lines can be used to feed a group of boosters (this is usually referred to as express power).

Systems and boosters according to embodiments of the invention may use any combination of features of the embodiments described herein. In particular a booster according to or used in some embodiments of the invention may be adapted to be powered in several ways to be chosen according to a particular application. A booster according to or used in some embodiments of the invention may be adapted to combine power from different sources.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system".

The figures described herein are block diagrams which illustrate the architecture, functionality, and operation of possible implementations of systems and methods according to various embodiments of the present invention. It should also be noted that, in some alternative implementations, the functions noted in the blocks may occur out of the order noted in the figures and the components of the blocks may be discrete or may be combined in different ways.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

It is to be understood that the phraseology and terminology employed herein is not to be construed as limiting and are for descriptive purpose only.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not unless otherwise stated preclude the addition of one or more components, features, steps, or integers or groups thereof and that the terms are to be construed as specifying components, features, steps or integers.

If the specification or claims refer to "an additional" element, that does not preclude there being more than one of the additional element unless otherwise stated.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A signal booster for time division duplex "TDD" signals in a TDD Digital subscriber line "DSL" environment comprising:
    first and second bidirectional terminals;
    an amplifier circuit arranged in a signal path between said first and second terminals to amplify TDD signals received at one of said first and second terminals for transmission from the other of said first and second terminals, said amplifier circuit being operable in a first configuration for amplifying TDD signals in one direction along the signal path and a second configuration for amplifying TDD signals in the opposite direction along the signal path;
    an analog to digital converter (ADC) which detects signals output from the respective amplifiers and convert them to digital output; and
    a control circuit arranged to use said digital output from the ADC to perform synchronization and detection of upstream "US"/downstream "DS" signals to identify a silent period in said signals and, in response to detecting a silent period, control said amplifier circuit to change configuration.

2. The booster according to claim 1, comprising a first amplifier for amplifying TDD signals in one direction along the signal path and a second amplifier for amplifying signals in the opposite direction.

3. The booster according to claim 2, wherein the control circuit is arranged to disable one of said first and second amplifiers and to enable the other of said first and second amplifiers to cause the amplifier circuit to change configuration in response to the detection of a silent period in the TDD signals.

4. The booster according to claim 2, wherein the control circuit is arranged to disconnect one of said first and second amplifiers from the signal path and to connect the other of said first and second amplifiers in the signal path to cause the amplifier circuit to change configuration in response to the detection of a silent period in the TDD signals.

5. The booster according to claim 1, wherein said amplifier circuit comprises an amplifier arranged to amplify signals in both directions between said first and second terminals.

6. The booster according to claim 5, wherein said amplifier comprises an input and an output arranged to be connected to said signal path and wherein the booster further comprises one or more switches arranged to be controlled by the control circuit to reverse connections of said amplifier input and output to said signal path.

7. The booster according to claim 1, wherein said terminals are configured for twisted pair wires.

8. The booster according to claim 7, configured to extract power for said amplifier circuit supplied via twisted pair wires connected to said terminals.

9. The booster according to claim 8, configured to extract power supplied by a plain old telephone service "POTS".

10. The booster according to claim 1, wherein said terminals are configured for wireless channels.

11. The booster according to claim 1, further comprising a power supply adapted to obtain local power for said amplifier circuit.

12. The booster according to claim 1, wherein said silent period occurs during the guard period between upstream and downstream signals.

13. A communication system comprising:
    service provider equipment for sending Time-Division Duplexing (TDD) signals to and receiving TDD signals from customer equipment in a TDD Digital subscriber line "DSL" environment; and
    a booster according to claim 1 arranged to boost signals in transit between said service provider equipment and said customer equipment, wherein said service provider equipment comprises a power feeding unit arranged to feed power via wires which also serve for transmission of said TDD signals.

14. A communication system comprising:
    customer equipment for sending Time-Division Duplexing (TDD) signals to and receiving TDD signals from service provider equipment in a TDD Digital subscriber line "DSL" environment; and
    a booster according to claim 1 arranged to boost TDD signals in transit between said service provider equipment and said customer equipment, wherein said customer equipment comprises a power feeding unit arranged to feed power via wires which also serve for transmission of said TDD signals.

* * * * *